(12) United States Patent
Subramanian et al.

(10) Patent No.: US 8,359,467 B2
(45) Date of Patent: Jan. 22, 2013

(54) ACCESS CONTROL SYSTEM AND METHOD

(75) Inventors: Murali Subramanian, Karnataka (IN); Animesh Singh, Karnataka (IN); Ratan Prasad Nalumasu, Cupertino, CA (US); Chandrika Malurpatna Sreedhar, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 836 days.

(21) Appl. No.: 11/774,570

(22) Filed: Jul. 7, 2007

(65) Prior Publication Data

US 2009/0013401 A1    Jan. 8, 2009

(51) Int. Cl.
*G06F 21/00* (2006.01)

(52) U.S. Cl. .......................................... 713/165; 726/30

(58) Field of Classification Search .................. None
See application file for complete search history.

(56) References Cited

U.S. PATENT DOCUMENTS

| | | | |
|---|---|---|---|
| 6,801,948 B2 | 10/2004 | Clark et al. | |
| 2002/0078383 A1 | 6/2002 | Leerssen et al. | |
| 2003/0009685 A1* | 1/2003 | Choo et al. | 713/200 |
| 2006/0294192 A1* | 12/2006 | Mao et al. | 709/213 |
| 2007/0056037 A1* | 3/2007 | Focke et al. | 726/22 |
| 2008/0301754 A1* | 12/2008 | Furuichi et al. | 726/1 |

OTHER PUBLICATIONS

HP-UX Reference, Section 4: File Formats HP-UX 11i Version 3, vol. 8 of 10, Feb. 2007, 8 pages.

"UNIX and Windows File Permissions in a Unified File System", Guide 6, Vers. 1, University of Durham Information Technology Service, Sep. 2006, 12 pages.

* cited by examiner

*Primary Examiner* — Philip Chea
*Assistant Examiner* — Carlton Johnson

(57) ABSTRACT

Certain embodiments of the invention relate to an access control system for controlling access to file system objects stored in a digital file system store. The system provides a first compartment rule type for granting a first permission to an entity, associated with a respective compartment to which the rule is applied, to lookup a directory object in a directory path and list the contents of the said directory object, and a second compartment rule type for granting a second permission to an entity, associated with a respective compartment to which the rule is applied, to lookup a directory object in a directory path and not to list the contents of the said directory object.

10 Claims, 4 Drawing Sheets

ACCESS CONTROL SYSTEM AND METHOD

FIELD OF THE INVENTION

The present invention relates to access rights in computer systems.

BACKGROUND OF THE INVENTION

Operating systems are typically computer programs or sets of computer programs that are loaded into a computer's memory and executed in order to control the subsequent operation of a computer. However, operating systems can also be embedded programs in firmware or hardware, particularly, for example, in portable devices such as mobile telephones and PDAs Most, traditional computer operating systems offer some kind of logical protection to data in the form of access controls, which can be granted or denied to specific people or groups of people. Generally, in a system that offers discretionary access control (DAC) a user (as opposed to an administrator) is able to assign permissions to their data, which permit or deny others (or groups of others) access to the data. This is fine for individuals. However, some organisations, such as military or government organisations in particular, require the ability to more closely control access to information. For example, top secret information should not be visible to most people in an organisation, restricted information, as the label suggests, should not be generally available, whereas unrestricted information may be available for access by anyone in an organisation.

Accordingly, secure operating systems are known, which provide greater access control over an organisation's information. Typically, secure operating systems associate additional classifications or labels with files and apply so-called mandatory access control (MAC), which provides a means of restricting access to the files based on their sensitivity (for example, as represented by a sensitivity label). In contrast to DAC, under MAC a user does not have the right to determine who sees their data: only users having a compatible clearance are permitted to see the data. For example, a user with top secret clearance would not have the ability to permit others with a lesser clearance to see their data.

MAC can be expressed in terms of "compartments". In practice, a compartment is typically a logical construct having an identifier such as a name, applied to which are a set of administrator-configured access control rules that define the compartment. Compartment rules are used to permit access only to those resources (such as files, processes and inter-process communication methods) necessary for an application to execute. These rules apply both to users and processes that have permission to operate in the compartment, and, accordingly, unless otherwise stated or unless the context dictates otherwise, such users and processes will be referred to herein generally as "entities".

Thus, entities operating within a compartment can only access files, other process and resources that are defined to be accessible in the same compartment, unless specific rules are provided to the contrary.

Secure operating systems typically have the additional access controls built into the core or kernel of the operating system so that it is difficult to compromise the security. Known secure operating systems are SELinux™, Trusted Solaris™ and HP UX Compartments™, and aspects and embodiments of the present invention can be applied to these operating systems, although the principles taught are more widely applicable.

In some secure operating systems, MAC is implemented using traditional object attributes such as read, write and execute privileges. A benefit of this approach is simplicity, since the attributes are available for use or adaptation in known operating systems and can be applied in certain ways to enforce MAC policies, thereby upgrading a standard operating system into a more secure operating system. However, in other respects, the use of these standard attributes can lead to certain disadvantages, and it is an object of embodiments of the invention to at least mitigate one or more of the problems of the prior art.

SUMMARY OF THE INVENTION

In accordance with one aspect of the present invention, there is provided an access control system for controlling access to file system objects stored in a digital file system store, the system providing a first compartment rule type for granting a first permission to an entity, associated with a respective compartment to which the rule is applied, to lookup a directory object in a directory path and list the contents of the said directory object, and a second compartment rule type for granting a second permission to an entity, associated with a respective compartment to which the rule is applied, to lookup a directory object in a directory path and not to list the contents of the said directory object.

In accordance with another aspect of the present invention, there is provided a file system lookup operation comprising:

a) receiving from an entity, which is associated with a compartment of a data processing system, a request to lookup a directory object of the file system;

b) determining, with respect to stored compartment rules applied to the said compartment, whether there is a first access permission, associated with the directory object, which permits directory object lookup and directory object contents listing by the entity;

c) if the outcome of b) is negative, then determining, with respect to the stored compartment rules applied to the said compartment, whether there is a second access permission, associated with the directory object, which permits directory object lookup and not directory object contents listing by the entity; and d) permitting the lookup operation only if the outcome of one of b) or c) is positive.

In accordance with another aspect of the present invention, there is provided a data processing system arranged to process a directory object lookup operation, comprising:

an input for receiving from an entity, which is associated with a compartment of the system, a request to lookup a directory object of a file system;

a store storing compartment rules and defining directory object access permissions;

a first process to determine, with respect to the stored compartment rules applied to the said compartment, whether there is a first access permission, associated with the directory object, which permits directory object lookup and directory object contents listing by the entity;

a second process, which operates if the outcome of an invocation of the first process is negative, to determine, with respect to the stored compartment rules applied to the said compartment, whether there is a second access permission, associated with the directory object, which permits directory object lookup and not directory object contents listing by the entity; and a third process, which enacts a requested lookup operation, only if the outcome of the first or second process is positive.

Known secure operating systems are SELinux™, Trusted Solaris™ and HP-UX Security Containment™, and embodiments of aspects of the present invention can be applied to these operating systems, although the principles taught are more widely applicable.

Further features and advantages of the invention will become apparent from the following description of preferred embodiments of the invention, given by way of example only, which is made with reference to the accompanying drawings.

DETAILED DESCRIPTION OF THE INVENTION

Figure 1:
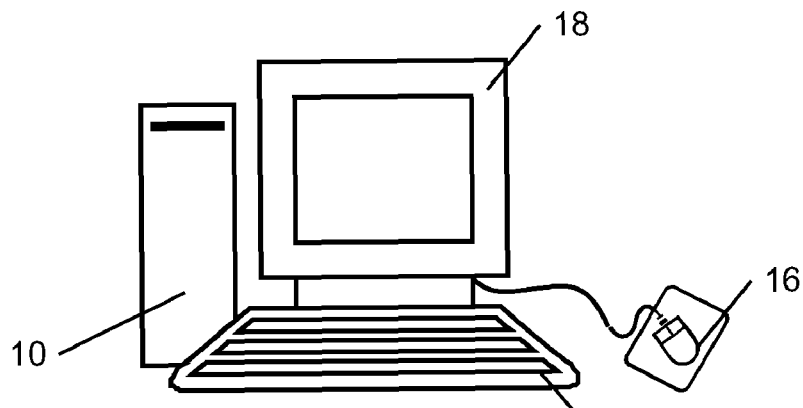
FIG. 1 is a diagram showing an exemplary computing environment suitable for operation according to embodiments of the present invention.

As already indicated, secure operating systems that implement MAC using traditional UNIX permissions such as read, write and execute can suffer from some disadvantages, particularly (though not exclusively) when the permissions are inheritable. Inheritance of permissions means that, unless otherwise specified, a file system object (such as a file or subdirectory) that is created in a certain directory will inherit the permissions that are assigned to the directory at the time of the creation. Without any specific intervention, the inheritance will cascade down a file system structure until or unless it is broken by an explicit permission setting.

The property of inheritance is in many respects a benefit, since it means that a system administrator does not have to set the permissions for each and every file system object in a file system. In contrast, some secure operating systems, such as those providing a labelled security protection profile (LSPP), do require each and every file system object to have independently set permissions, which can increase security but without doubt increases system administration overheads.

In known systems, a read permission controls access to file system objects. If the file system object is a directory, an entity which has been granted the permission has the ability to change the working directory to that directory (for example, using the UNIX change directory or cd command) and list and search the contents of the directory (for example, using the UNIX list or ls command). Unless explicitly stated to the contrary, file system objects created in a directory having the read permission inherit the read permission. If the file system object is a file, the entity then has the ability to open the file for reading (for example, using the UNIX cat command).

When it is necessary for an entity to have permissions to search a directory, it is by default also necessary for the entity to have permissions to search each directory which is higher up in the directory structure: if an entity does not have permissions to search a directory then clearly it cannot determine what subdirectories exist. According to certain known systems, which rely on using an inherited read permission to provide search access to directories, the only way to grant such search permissions to directories is to grant read permissions on those directories. A disadvantage of this is that, in acquiring permissions to read file system objects in the subdirectory, the entity by default also acquires permissions to list the contents of each parent directory of the subdirectory. This places restrictions on the kind of content that should be stored in the parent directories, such that content that should not be visible to the entity must not be stored in these directories. Embodiments of the present invention aim to address this problem by introducing a new kind of directory access permission, called (in an embodiment to be described) "nsearch" (which stands for non-inheritable search). As will be described, the nsearch permission, when applied to a directory, enables an entity to search the directory, and change the working directory to that directory, but not to list the contents of that directory, as will be described in more detail below.

Before describing embodiments of the invention in more detail, a computing environment suitable for implementing certain embodiments of the invention will now be described.

An exemplary computing platform 10 suitable for implementing embodiments of the invention is illustrated in the diagram in FIG. 1. The computing platform 10 has the standard features of a keyboard 14, a mouse 16 and a visual display unit (VDU) 18, which provide the physical 'user interface' of the platform. The platform contains standard components such as a mother board and a hard disk drive for storing a file system.

Figure 2:
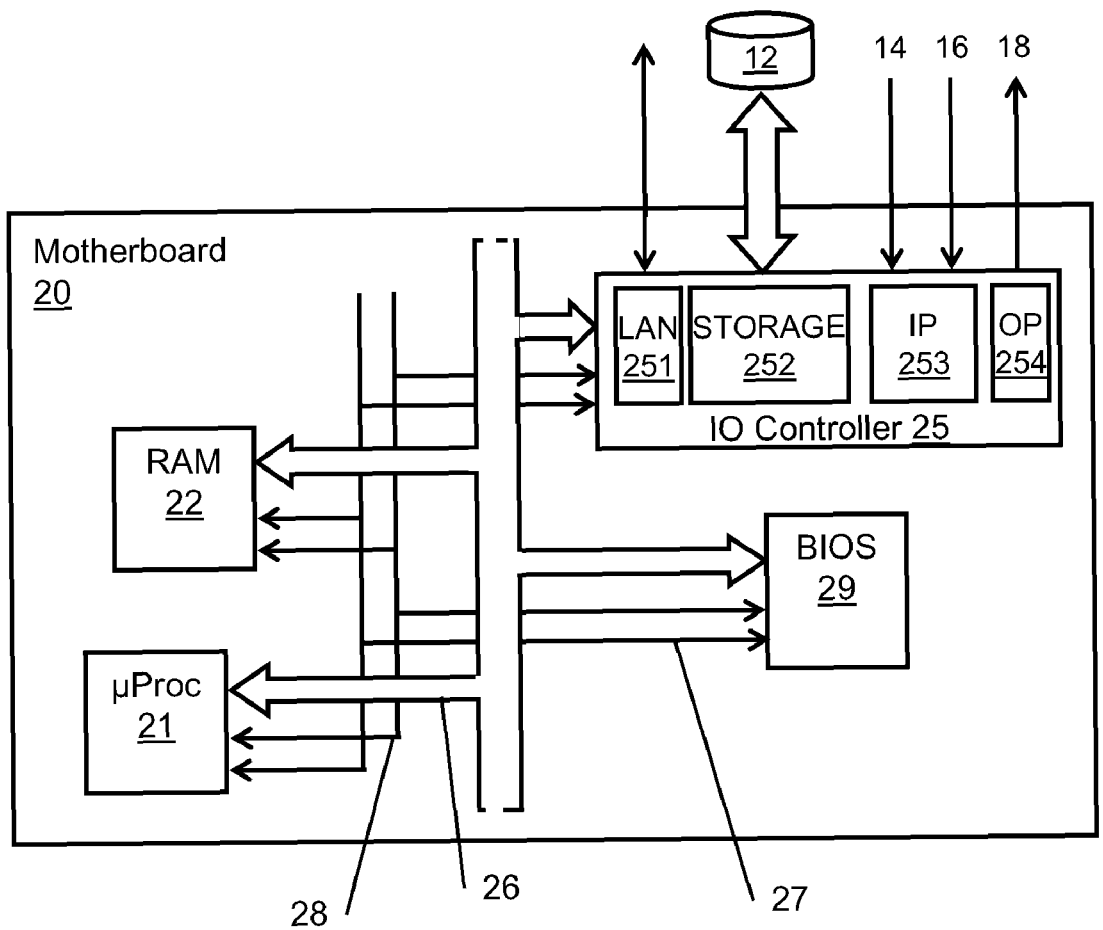
FIG. 2 is a diagram showing an exemplary motherboard for use with a computing platform of the kind shown in FIG. 1.

As illustrated in FIG. 2, the motherboard 20 of the computing platform 10 includes (among other standard components) a main processor 21, main memory 22, a data bus 26 and respective addressing lines 27 and control lines 28, BIOS memory 29 containing the BIOS program for the platform 10 and an Input/Output (IO) controller 25. The IO controller 25 (which may comprise one or more independent subsystems) controls interaction between the components of the motherboard and connected devices such as the keyboard 14 and the mouse 16 (via an input controller 253), the VDU 18 (via an output controller 254, for example a screen or graphics controller), a storage device 12 such as a hard disk (via a storage controller 252) and the outside world (via a network controller 251, for example an Ethernet LAN controller), which may be embodied on a network interface card (NIC). Communications with the outside world, for example across the Internet, are directed via the network controller 251 and, typically, include data packets. In known systems, the data packets are typically addressed to travel via a logical port number of a NIC or the like, as will be described in more detail hereinafter.

The main memory 22 is typically random access memory (RAM) and the BIOS memory is typically EEPROM, which can be 'flashed' with BIOS updates. In operation, the platform 10 loads the BIOS from the BIOS memory 29 and, in turn, loads an operating system from the hard disk 12 into RAM. The operating system controls every aspect of the operation of the computing platform and, in the present example, is a secure operating system that provides compartments. Additionally, in operation, the operating system loads the processes or applications that may be executed by the platform 10 into RAM 22 from hard disk 12.

Figure 3:
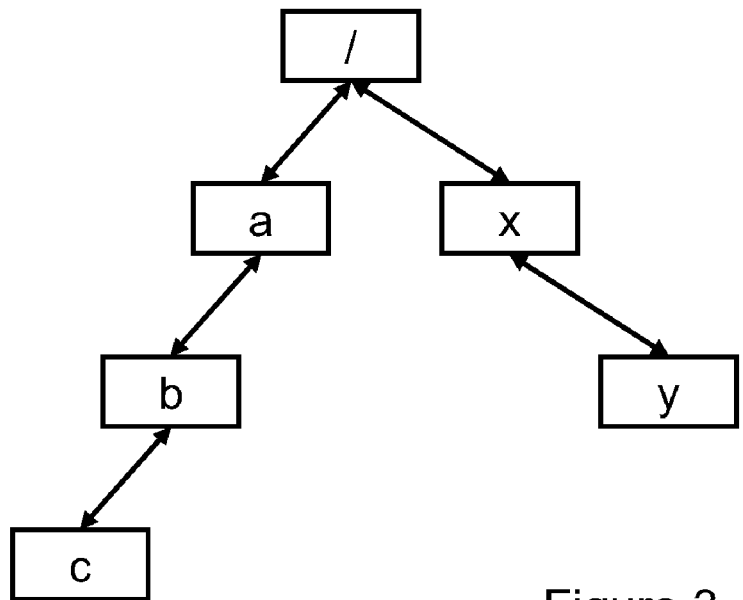
FIG. 3 is a schematic diagram illustrating a first exemplary file structure.

An exemplary file system, which will be used to describe examples of the present invention, is illustrated in the diagram in FIG. 3. The file system is a Virtual File System 408 (VFS), insofar as the structure and arrangement of the actual or physical file system is hidden from the user, and from applications accessing the file system. The file system may be local to the computing platform 10 (for example stored on the hard disk 12), remote from the computing platform (for example stored on a network server 42), or (commonly nowadays) a combination of both. The physical arrangement of the file system is immaterial to the present invention.

The file system shown illustrates a root directory "/" and two branches. A first branch from the root directory contains a subdirectory called "a", which has a subdirectory called "b", which itself has a subdirectory called "c". A second branch from the root directory contains a subdirectory called "x", which has a subdirectory called "y". In practice, the branch starting with the a subdirectory may be associated with a first compartment and the branch starting with the x subdirectory may be associated with a second compartment.

Figure 4:
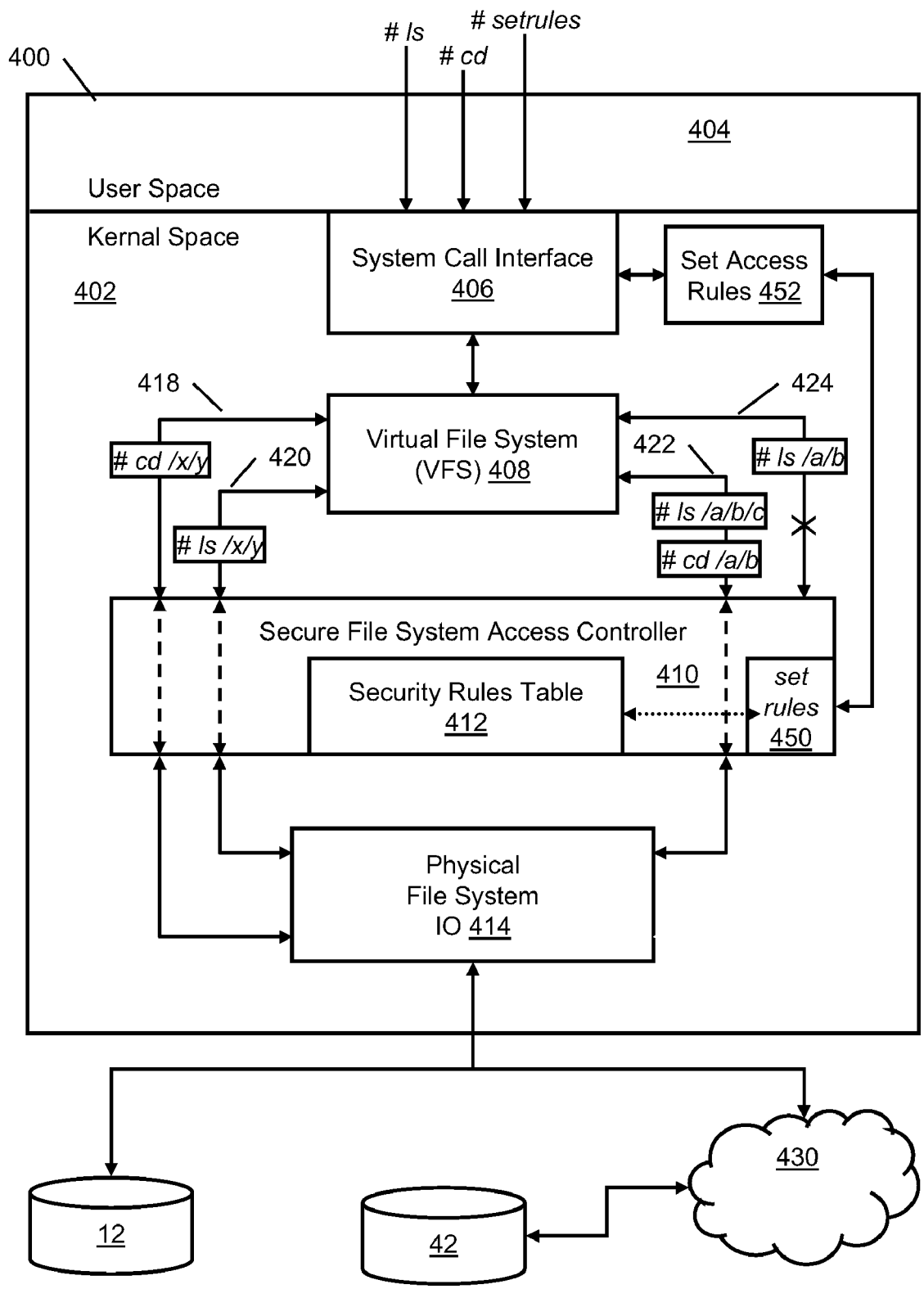
FIG. 4 is a schematic diagram illustrating the functional elements of a secure operating system that are necessary for implementing an embodiment of the present invention.

The diagram in FIG. 4 provides a high-level functional representation of a portion of an exemplary secure operating system, which has been adapted for operation according to the present embodiment. It is emphasised that embodiments of the invention are in no way limited to the arrangement or architecture illustrated in FIG. 4. One example of a secure operating system on which certain embodiments of the invention may be practiced is HP-UX Security Containment, version 2, release 11.31, which provides MAC and can be adapted as described herein to provide file system access using traditional read, write and execute permissions, as well as the new nsearch permission, as will be described. The operating system supports UNIX-like commands. Again, embodiments of the invention are in no way limited to UNIX-based operating systems. For example, the principles could be applied equally to a Microsoft™ Windows™ based operating system or, indeed, to any other kind of operating system, including bespoke or embedded operating systems or the like. It will be appreciated, however, that certain embodiments of the invention may be implemented on other existing secure operating systems, and the principles described herein are in no way limited to application in the HP-UX product.

The operating system is shown having a Kernel Space 402, which is memory reserved for running the kernel of the operating system, and a User Space 404. The kernel is generally responsible for managing the computing platform's resources and the communications between the hardware and software components. The User Space 404 is a memory area where user applications execute and operate. The User Space 404 receives input from the user (via the mouse or keyboard) and passes it on to a System Call Interface 406. In the present context, when the input relates to a file system access request of some kind, the command is passed by the System Call Interface 406 to the VFS 408. The command typically consists of a command and zero or more arguments, which can include a directory name or path. For example, a command to list the contents of a current working directory might be:

ls where the "#" symbol means the following command is executed, for example on the command line, and no arguments are required as the command relates to a current working directory. In contrast, a command to list the contents of directory c of FIG. 3 might be:

ls /a/b/c where the argument "/a/b/c" means start at the root directory (the first "/") and navigate to directory c via directory b.

Whether or not a directory can be listed using the ls command depends on whether the entity has the access permissions to do so, wherein the access permissions are set using MAC.

The purpose and operation of a VFS 408 is well known in the art of computer systems and need not be described herein in any significant detail. The reader is referred to reference works such as "Vnodes: An Architecture for Multiple File System Types in Sun UNIX", S. R. Kleiman, Sun Microsystems, or the book "UNIX Internals: The New Frontiers" by Uresh Vahalia, for further detail. In brief, the VFS 408 receives a file system independent command (such as "# ls /a/b/c") and maps it to a particular, file system dependent, physically stored file system object—that is, a directory object, a file object and so on—which can be accessed using the VFS 408.

Accessing file system objects is a two-step process, including a first VFS 408 'lookup' (or search) step, which attempts to traverse the directory path from the root directory "/" to the specified target file system object to identify a specified file system object in the VFS 408, and a second step involving executing the specified command on, or in relation to, the specified file system object that was found by the lookup. The lookup step requires that the respective entity has permissions to access each intermediate file system object on the path between the root directory and the specified target file system object which is the subject of the lookup request.

During the lookup operation, the access permissions of the specified file system object must be checked. Referring again to FIG. 4, the permissions are checked by a Secure File System Access Controller (SFSAC) 410, which, effectively, grants or denies access to the respective file system object with reference to a Security Rules Table 412. In effect, the SFSAC 410 is a rules processor. The Security Rules Table 412 includes the rules that either grant or deny access permissions to file system objects, as will be described in more detail below, which are set by a systems administrator. If the appropriate MAC access permissions are available for accessing the specified target file system object, the second access step of executing the specified command (for example, "ls") takes place via a Physical File System IO subsystem 414 using the BIOS with reference to the VFS 408 file system object, which was identified in the first step. As already indicated, part of the physical file system may reside on a local hard disk 12 and part may reside remotely, via a network 430, on a file server 42 or the like.

As indicated, a lookup operation, which is required for accessing a file system object, must navigate the respective file system path to the target file system object, and to achieve this, the appropriate permissions must be provided at each intermediate file system object. In essence, for example, the lookup operation first must have the permissions to navigate to directory c, by passing from the root directory and through directories a and b. If at any point while navigating the directory path the lookup operation finds that the entity does not have appropriate lookup permissions, then the lookup operation fails.

Consider, by way of a first example, a scenario in which there are three permissions R/, Rx and Ry, respectively, associated with the /x/y branch of the exemplary file system. The rules are stored in the Security Rules Table 412 and are controlled by the SFSAC 410. R/ is the permission associated with the root /, ###Rx' is the permission associated with the directory x and Ry is the permission associated with the directory y. These permissions may be arranged in the Security Rules Table 412 as follows:

| security_rules_table_1 | | |
|---|---|---|
| / | R/ | {permission 1} |
| /x | Rx | {permission 2} |
| /x/y | Ry | {permission 3} |

Steps in a respective lookup operation, according to the present embodiments, for traversing the directory path "/x/y" may be as follows:

lookup(NULL, "/")→V/→R/
    lookup(V/, "x")→Vx→Rx
    lookup(V/, "y")→Vy→Ry

Each line of the code steps through the path, identifying a respective VFS 408 object and checking the associated permissions. The first line establishes that the root directory/ maps to the VFS 408 directory V/ and is associated with security rule R/; the second line establishes that, in relation to V/, directory x maps to VFS 408 directory Vx and is associated with security rule Rx; and the third line establishes that, in relation to V/, directory y maps to VFS 408 directory Vy and is associated with security rule Ry.

In this first example, if an entity needs the ability to list the contents of directory y, for example using the ls command, then, a known way of achieving this is by setting all three permissions (permission 1, permission 2 and permission 3) as read permissions. As explained, the read permission controls list and search access to file system objects. In this way, the lookup operation is able to traverse the path /x/y. The entity, thus, has the rights to list the contents of the / and x directories even though list rights only for directory y are required. This example is illustrated in the diagram in FIG. 4 by the left hand two paths, 418 and 420, respectively, designated "# cd /x/y" and "# ls /x/y", as both cd and ls rights are available.

By way of a second example, three permissions R/, Ra and Rb are provided, respectively, associated with the '/a/b/c' branch of the exemplary file system. R/ is the permission associated with the root /, Ra is the permission associated with the directory a and Rb is the permission associated with the directory b. These permissions may be arranged in the Security Rules Table 412 as follows:

| security_rules_table_2 | | |
|---|---|---|
| / | R/ | {permission 4} |
| /a | Ra | {permission 5} |
| /a/b | Rb | {permission 6} |

Steps in a respective lookup operation for traversing the directory path "/a/b/c" may be as follows:

lookup(NULL, "/")→V/→R/
    lookup(V/, "a")→Va→Ra
    lookup(V/, "b")→Vb→Rb
    lookup(V/, "c")→Vc→Rb As before, each line of the code steps through the path, identifying a respective VFS 408 object and checking the respective permissions. The first line establishes that the root directory / maps to the VFS 408 directory V/ and is associated with security rule R/; the second line establishes that, in relation to V/, directory a maps to VFS 408 directory Va and is associated with security rule Ra; the third line establishes that, in relation to V/, directory b maps to VFS 408 directory Vb and is associated with security rule Rb; and the fourth line establishes that, in relation to V/, directory c maps to VFS 408 directory Vc and is associated with security rule Rb, even though no specific permission has been set for directory c, since directory c has inherited its permissions from directory b.

In this second example, if an entity needs the ability to list the contents of directory c, for example using the ls command, then, one way of achieving this is by setting all three permissions (permission 4, permission 5 and permission 6) as read permissions, as before. In this way, the lookup operation is able to traverse the path /a/b/c. The entity, thus, has the rights to list the contents of the /, a and b directories even though list rights only for directory y are required.

Now, according to an embodiment of the present invention, list access to directory c may alternatively be achieved including by using a new permission, which is referred to by way of example only as nsearch. The nsearch permission controls search (that is, 'lookup') access to a file system object which is a directory. The nsearch permission allows entities associated with a compartment to perform a lookup in the associated directory. The "n" in nsearch denotes that the permission is 'not inherited'. Therefore, even if the working directory is searchable, any directory underneath is not searchable unless that operation is explicitly allowed. The nsearch permission permits a lookup operation and a change directory cd operation, but, unlike read, does not permit a directory list ls operation. According to the present embodiment, achieving list access to directory c including by using nsearch requires an additional permission Rc to be set for directory c, as follows:

| security_rules_table_3 | | |
|---|---|---|
| / | R/ | {permission 7} |
| /a | Ra | {permission 8} |
| /a/b | Rb | {permission 9} |
| /a/b/c | Rc | {permission 10} |

Thus, if permissions 7, 8 and 10 are set to be read permissions and permission 9 is set to be nsearch, the effect would be to permit list access to directories /, a and c but prevent list access to directory b. In effect, an entity can thereby be given read access to a subdirectory without requiring that read access is granted to parent directories. This example is represented in the diagram in FIG. 4 by the right hand two paths, 422 and 424, respectively, designated "# ls /a/b/c" and "# cd /a/b", which are both permitted (in the left most path), and "# ls /a/b", which is denied (in the right most path), as both cd and ls rights are available.

Figure 5:
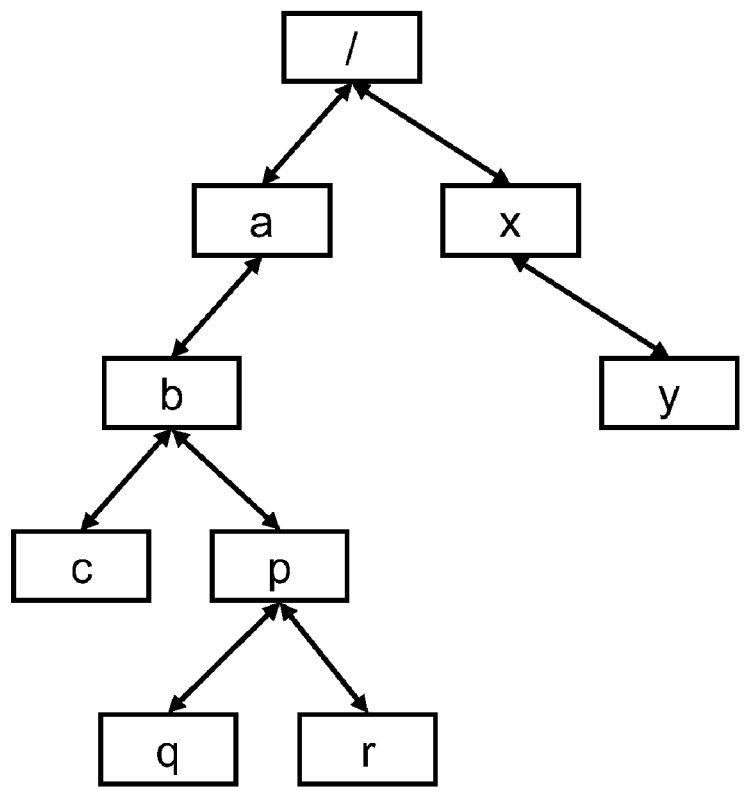
FIG. 5 is a schematic diagram illustrating a second exemplary file structure.

An advantage of using nsearch (or an equivalent) can be appreciated by reference to the file system represented in the diagram in FIG. 5.

The file structure in FIG. 5 is similar to the one in FIG. 3, apart from there being in FIG. 5 an additional file system branch stemming from directory b. The additional branch comprises a subdirectory p, which has subdirectories q and r. If permission 9 is set as a read permission, then an entity is able to list the contents of subdirectory b and thereby gain knowledge at least of subdirectory p. However, if permission 9 is set as nsearch, then an entity is can be given legitimate access to directory c, via directory b, but without rights to list the contents of directory b; and the additional branch remains invisible to the entity.

According to the present embodiment, the additional permission Rc is required for subdirectory c as the nsearch permission is arranged not to be inheritable. That is, without specifically setting the Rc permission, the entity would have no permissions to access directory c. In principle, the nsearch permission (or an equivalent or additional permission) could be inheritable, which may be beneficial in instances where there are a number of intermediate subdirectories that need lookup but not read permissions.

Figure 6:
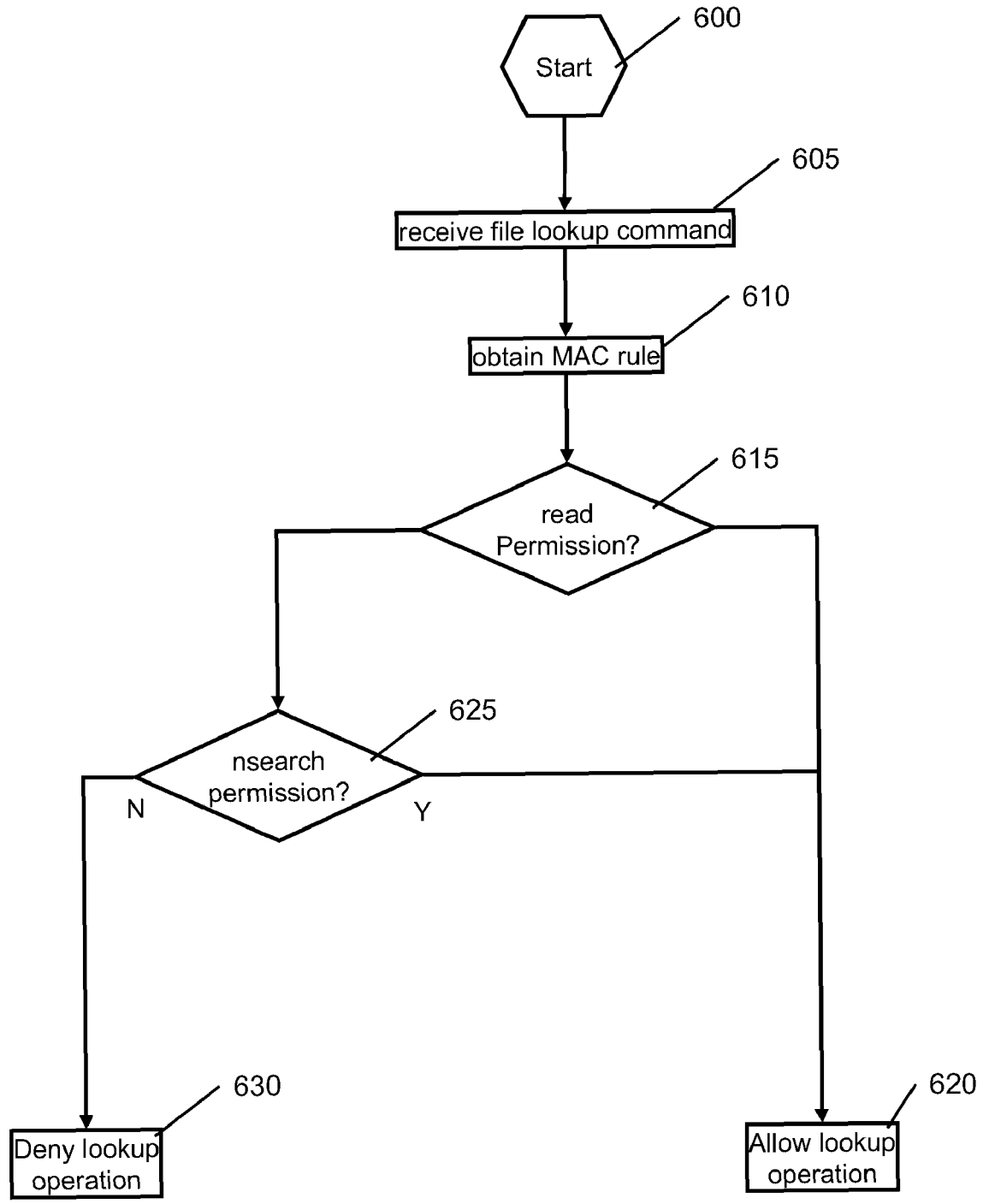
FIG. 6 is a flow diagram showing steps involved in looking up a directory in a directory structure according to an embodiment of the present invention.

According to the present embodiment, a lookup operation is adapted to take into account both read and nsearch permissions for MAC, as illustrated in the flow diagram in FIG. 6. A known lookup operation would only check for read MAC permissions.

The lookup operation starts in step 600. In step 605, a lookup command and arguments (for example "lookup(V/, "b ")) are received and a VFS file system object identifier Vb is obtained. In step 610, a respective MAC rule Rb associated with the VFS 408 object identifier is obtained from the Security Rules Table 412. In step 615, a determination is made of whether the rule Rb is a read permission. If Rb is a read permission, then the lookup operation is permitted in step 620 (according to the prior art, if Rb is not a read permission then the process would end with the lookup operation being denied). However, according to the present embodiment, if Rb is not a read permission, a further test is undertaken in step 625 to determine if Rb is the nsearch permission. If Rb is not the nsearch permission, then the lookup operation is denied in step 630. However, if Rb is associated with 'nsearch' permission then the lookup access is allowed in step 620.

The operation described above in relation to FIG. 6 is implemented, according to the present embodiment, by modifying a known VFS process to include the additional MAC rule check step in the, otherwise standard, lookup operation. In essence, the modified VFS 408 correlates each lookup operation with the MAC rules identified in the Security Rules Table 412 by calling the SFSAC 410.

File system access permissions are set according to the present embodiment by including appropriate file system entries into the Security Rules Table 412, which is incorporated into the secure operating system, as illustrated in the diagram in FIG. 4.

An example of setting file system access permissions, according to an embodiment of the present invention, in the HP-UX Security Containment secure operating system, will now be described for an exemplary compartment called database. The access permission, like other compartment MAC rules, are entered into a text file called database.rules. The text file takes the following form:

```
compartment database {
    permission nsearch /
    permission nsearch /a
    permission nsearch /a/b
    permission read,write /a/b/c
}
```

The above defines a compartment called database and defines MAC rules such that directories /, a and b have the nsearch permission and the directory c has both read and write permissions.

Of course, there would typically be many more rules required for setting up a compartment, for example
  permission read /usr
  permission read, write /tmp
  permission nsearch /var
  permission read, write /var/tmp
and only those for establishing full access to directory c,while denying access, other than lookup access (that is nsearch access), to directory b are shown.

An example of a secure operating system is HP-UX Security Containment version 2, release 11.31, which is supplied by Hewlett-Packard Company and provides the nsearch permission, which is described herein. In this operating system, a compartment definition comprising MAC definitions can be loaded using a program called setrules, which is found in the system directory /usr/sbin. The setrules program is arranged to parse database.rules and set each rule for a compartment in turn. The setrules program is arranged to read database.rules from a system directory called /etc/cmpt, which is where the systems administrator must store database.rules.

The system administrator executes setrules using the following command line:
  # /usr/sbin/setrules The secure operating system illustrated in FIG. 4 includes a functional block 450 representing the setrules program. As already described, the program resides in a specified directory, but is shown as part of the SFSAC 410, as it provides an interface, which enables a systems administrator to set up compartments on the basis of a text file definition, rather than having to access and generate or modify kernel code or associated definitions. When a systems administrator wishes to set up a compartment by defining its MAC policy as described above, they generate a set file such as database.rules and store it in /etc/cmpt. They then issue a command line such as # /usr/sbin/setrules to initiate the generation of the compartment. The System Call Interface 406 receives the command input, recognises it and forwards it to a Set Access Rules handler 452, which invokes the setrules process, which in turn loads the compartment definitions into the Security Rules Table 412.

The above embodiments are to be understood as illustrative examples of the invention. Further embodiments of the invention are envisaged. While it has been indicated that certain embodiments of the invention may be implemented by adapting an HP-UX Security Containment secure operating system, other embodiments may be implemented by adapting other known secure operating systems such as SELinux™ or Trusted Solaris™, or, indeed, any other secure operating system that can be adapted to define compartment rules for accessing file system objects.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. An access control system stored in a memory and implemented on at least one computing platform, for controlling access to file system objects stored in a digital file system store, the system comprising:
a first compartment rule type for granting a first permission to an entity, associated with a respective compartment to which the rule is applied, to lookup a directory object in a directory path where the directory object is located and list the contents of the directory object, wherein lookup comprises traversing the directory path from a root directory to the directory object to identify the directory object in the file system store; and
a second compartment rule type for granting a second permission to the entity, associated with a respective compartment to which the rule is applied, to lookup a directory object in a directory path where the directory object is located and not to list contents of the directory object, wherein lookup comprises traversing the directory path from a root directory to the directory object to identify the directory object in the file system store, and wherein the system is arranged such that, if the second rule type is applied to a first directory object and the first rule type is applied to a second directory object underneath the first directory object, then said entity, which is associated with a compartment with which the rules are applied, has permissions to lookup both said directories and list the contents of only the second directory such that the contents of the first directory not located in the directory path are invisible to the entity.

2. The system of claim 1, wherein the second rule type is not inherited by file system objects underneath a said directory object to which the rule is applied.

3. The system of claim 1, wherein the first rule type is inherited by file system objects in or underneath a said directory object to which the rule is applied.

4. The system of claim 1, wherein at least the second rule type is a Mandatory Access Control rule.

5. The system of claim 1, comprising a Mandatory Access Control system.

6. The system of claim 5, which is arranged to apply Mandatory Access Control rules on a per compartment basis to control access to file system objects which are associated with a compartment.

7. The system of claim 1, wherein said entity is a user of the system or a process.

8. The system of claim 1, wherein the second rule type is nsearch.

9. A file system lookup operation stored in memory and implemented on at least one computing platform, comprising:
a) receiving from an entity, which is associated with a compartment of a data processing system, a request to lookup a directory object of a file system, wherein lookup comprises traversing a directory path where the directory object is located from a root directory to the directory object to identify the directory object in the file system;
b) determining, with respect to stored compartment rules applied to the compartment, whether there is a first access permission, associated with the directory object, which permits directory object lookup and directory object contents listing by the entity;
c) if the outcome of b) is negative, then determining, with respect to the stored compartment rules applied to the compartment, whether there is a second access permission, associated with the directory object, which permits directory object lookup and not directory object contents listing by the entity; and
d) permitting the lookup operation only if the outcome of one of b) or c) is positive, wherein if the second access permission is associated with a first directory object and the first access permission is associated with a second directory object underneath the first directory object, then said entity, which is associated with a compartment with which stored rules are applied, has permissions to lookup both said directories and list the contents of only the second directory such that the contents of the first directory not located in the directory path are invisible to the entity.

10. A data processing system, arranged to process a directory object lookup operation, stored in memory and implemented on at least one computing platform, comprising:
an input for receiving from an entity, which is associated with a compartment of the system, a request to lookup a directory object of a file system, wherein lookup comprises traversing a directory path where the directory object is located from a root directory to the directory object to identify the directory object in the file system;
a store storing compartment rules and defining directory object access permissions;
a first process to determine, with respect to the stored compartment rules applied to the compartment, whether there is a first access permission, associated with the directory object, which permits directory object lookup and directory object contents listing by the entity;
a second process, which operates if the outcome of the first process is negative, to determine, with respect to the stored compartment rules applied to the compartment, whether there is a second access permission, associated with the directory object, which permits directory object lookup and not directory object contents listing by the entity; and d) a third process, which enacts a requested lookup operation, only if the outcome of the first or second process is positive, wherein if the second access permission is associated with a first directory object and the first access permission is associated with a second directory object underneath the first directory object, then said entity, which is associated with a compartment with which stored rules are applied, has permissions to lookup both said directories and list the contents of only the second directory such that the contents of the first directory not located in the directory path are invisible to the entity.

* * * * *